US009031172B2

(12) United States Patent
Dore et al.

(10) Patent No.: US 9,031,172 B2
(45) Date of Patent: May 12, 2015

(54) EQUALIZING METHOD AND DEVICE FOR A NON-LINEAR TRANSMISSION CHANNEL

(71) Applicant: Commissariat a l'Energie Atomique Et Aux Ene Alt, Paris (FR)

(72) Inventors: Jean-Baptiste Dore, Saint Martin le Vinoux (FR); Florian Pebay-Peyroula, Saint-Nizier-du-Moucherotte (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/067,137

(22) Filed: Oct. 30, 2013

(65) Prior Publication Data

US 2014/0126623 A1    May 8, 2014

(30) Foreign Application Priority Data

Nov. 2, 2012   (FR) ..................... 12 60459

(51) Int. Cl.
*H04L 27/01* (2006.01)
*H04B 5/00* (2006.01)
*H04L 25/03* (2006.01)
*H04L 27/20* (2006.01)
*H04L 27/22* (2006.01)

(52) U.S. Cl.
CPC ........ *H04B 5/0025* (2013.01); *H04L 25/03178* (2013.01); *H04L 27/2071* (2013.01); *H04L 27/22* (2013.01); *H04L 27/01* (2013.01)

(58) Field of Classification Search
CPC . H04L 1/0054; H04L 25/03203; H03M 13/41
USPC ................... 375/341; 714/795, 796
See application file for complete search history.

(56) References Cited

U.S. PATENT DOCUMENTS

2009/0059661 A1* 3/2009 Yang et al. ................. 365/185.2

FOREIGN PATENT DOCUMENTS

WO   WO 2008/055207 A2   5/2008

OTHER PUBLICATIONS

French Preliminary Search Report issued Aug. 26, 2013 in French Application 12 60459, filed on Nov. 2, 2012 ( with English Translation of Category of Cited Documents).
U.S. Appl. No. 14/318,838, filed Jun. 30, 2014, Dore, et al.

* cited by examiner

*Primary Examiner* — Kevin Kim
(74) *Attorney, Agent, or Firm* — Oblon, McClelland, Maier & Neustadt, L.L.P.

(57) ABSTRACT

The present invention relates to a method for equalizing modulation symbols transmitted on a non-linear transmission channel. The equalizing method operates on a sequence of observables, each non-linearly depending on a predetermined number of consecutive modulation symbols, and is based on a Viterbi algorithm. It comprises a prior step of receiving a pilot sequence of modulation symbols and storing corresponding observables (110), said pilot sequence leading to a path passing through all the branches of the lattice.
In a second step (120), for each symbol to be equalized, for each branch, a branch metric is calculated as a distance between the observable corresponding to the modulation symbol to be equalized and the observable stored for said branch.

10 Claims, 6 Drawing Sheets

EQUALIZING METHOD AND DEVICE FOR A NON-LINEAR TRANSMISSION CHANNEL

TECHNICAL FIELD

The present invention generally relates to the field of equalization and is more particularly applicable to near field communication systems, such as RFID (Radio Frequency Identification) systems and NFC (Near Field Communication) systems.

STATE OF PRIOR ART

The near field communication systems (RFID, NFC) are widespread in the general public.

Initially intended to transfer low amounts of data, these systems now require for some new applications (biometric file transfer stored in electronic passports, image file transfer stored in medical files, etc.) to be able to transmit a high amount of information in very short times.

Therefore, it has been provided within the scope of the ISO 14443 standard relating to contactless identification cards, an evolution of the characteristics of the physical layer enabling very high rates (up to 27.12 Mbits/s) to be supported. More generally, the ISO 14443 standard defines the characteristics with which a bidirectional communication between a contactless reader, also called PCD (Proximity Coupling Device) and a passive transponder or PICC (Passive Inductive Coupled Card) must comply.

On the uplink, the passive transponder transmits information by modulating the phase of a carrier at the frequency $F_{sc}$, the phase modulation being performed by simply connecting and disconnecting the antenna to and from a load. The bits to be transmitted are BPSK (Binary Phase Shift Keying) modulated, the BPSK symbols modulating the carrier at a modulation frequency $F_s = F_{sc}/n$.

Conversely, on the downlink, it is provided in the standard in question, that the contactless reader is able to transmit at a high rate (6.8 Mbits/s to 27.12 Mbits/s) using a M-PSK modulation. More precisely, bits are converted in symbols of a modulation alphabet M-PSK, each symbol being transmitted during a symbol time $T_s = 1/F_s$. The modulation degree, that is the cardinal of the modulation alphabet, as well as the symbol time give the bit rate.

Currently, the modulation degree M is set to 2, a bit equal to 0 being transmitted with a phase $-\Phi/2$ and a bit equal to 1 with a phase $\Phi/2$. The $\Phi$ value is selected relatively low to minimize signal discontinuities, for example $\Phi = \pi/8$.

The signal transmitted by the reader can be written as:

$$s(t) = A \cos(2\pi F_c t + m(t) + \phi_0) \quad (1)$$

where A, $F_c$ and $\phi_0$ are the amplitude, frequency and the initial phase of the carrier respectively and where m(t) is the phase modulation term given by:

$$m(t) = \sum_k \Phi_k g(t - kT_s) \quad (2)$$

where $\Phi_k$ it the phase of the kth PSK symbol and g(t) is a shaping function for example the slot function defined by:

$$g(t) = 1 \text{ if } 0 \leq t < T,$$

$$g(t) = 0 \text{ otherwise} \quad (3)$$

At the PICC, the received signal is translated into baseband, sampled with a frequency $F_s$ and the obtained samples, $r_k$, can be written as:

$$r_k = a_k e^{j\Phi_k} \quad (4)$$

where $a_k$ is the amplitude (positive real) of the sample and $\Phi$ its phase. It is assumed that there is a perfect synchronization of sampling with respect to the received symbols.

The thus obtained samples are then phase differential demodulated. Equivalently, the phase differential demodulation can be performed in analogue format and the result sampled and converted into digital format. In any case, the differential demodulator provides the phase difference between two consecutive samples of the signal into baseband:

$$y_k = \arg(r_k r_{k-1}^*) \quad (5)$$

where arg(z) represents the phase of the complex number z and .* is the phase conjugation.

In the absence of intersymbol interference and noise on the transmission channel, the phase $y_k$ output from the differential demodulator is none other than:

$$y_k = \Phi_k - \Phi_{k-1} \quad (6)$$

Thus, if the phase at start is known, the phases $\Phi_k$ and thus the transmitted bits can be deduced therefrom.

However, in practice, for high transmission rates and consequently low symbol times $T_s$, the received signal is altered by intersymbol interference. The signal received is the result of the convolution of the signal transmitted by the impulse response of the channel and the samples $r_k$ can then be written as:

$$r_k = \sum_{p=0}^{L-1} h_p s_{k-p} \quad (7)$$

where L is the spreading of the channel expressed in symbol time and $s_{k-p}$ is the sample of the signal emitted at the time $(k-p)T_s$, expressed in baseband.

The output of the differential demodulator is then written as:

$$y_k = \arg\left(\sum_{p=0}^{L-1} \sum_{q=0}^{L-1} h_p h_q s_{k-p} s_{k-q-1}^*\right) \quad (8)$$

It is understood that the demodulator output is therefore non-linear and consequently that some conventional equalization techniques, such as the ZF (Zero Forcing) equalization or the MMSE (Minimum Mean Square) equalization are not applicable.

It is thus necessary to provide an equalization technique compatible with a non-linear character of the transmission channel (taken herein in the common sense, that is including the differential demodulator) and with the modulation alphabet (PSK).

It has been suggested in the article by B. Yu et al. entitled "*The application of the CMA blind equalization in UHF RFID systems*", published in Proc. of IET Conf. On Wireless, Mobile and Sensor Networks, December 2007, pp 326-329, to use a CMA (Constant Modulus Algorithm) type blind adaptive equalization, well suited to the PSK modulation. However, this equalization method requires complex calculations (pseudo-matrix inversion) and consequently significant resources which are not much conceivable in a PICC.

The object of the present invention is to provide an equalization method on a non-linear transmission channel, such as that contemplated above, which does not require significant calculations resources. A secondary object of the present invention is to provide an equalization method for such a channel which could be well suited to a differential demodulation of PSK symbols.

DISCLOSURE OF THE INVENTION

The present invention is defined as a method for equalizing modulation symbols transmitted by a transmitter on a transmission channel to a receiver, the receiver providing observables each non-linearly depending on a predetermined number L of consecutive modulation symbols, said method determining from a sequence of observables the most likely sequence of modulation symbols by means of a Viterbi algorithm operating on a N-state lattice, each state representing a state of the transmission channel, each branch between two consecutive states of the lattice being associated with a modulation symbol. According to this method:

in a initializing step, a pilot sequence of modulation symbols is received, said pilot sequence being in the form of a path passing through all the allowed branches of the lattice, and the corresponding observable is stored for each of these branches;

a sequence of modulation symbols to be equalized is received and the most likely sequence of modulation symbols is determined as that corresponding to the lowest metric path in the lattice, a metric of a path being calculated as the sum of the metrics of the branches which make it up and a branch metric being calculated as a distance between the observable provided for the modulation symbol to be equalized and the observable stored for said branch.

Advantageously, the pilot sequence of modulation symbols leads to a path passing once and only once through each allowed branch of the lattice.

According to an alternative, the modulation symbols are PSK symbols succeeding each other at a symbol frequency ($f_s$) and the observables are obtained as the hermitian product of consecutive samples of the signal received in baseband, the sampling being performed at the symbol frequency.

The PSK modulation symbols can be in the form of $e^{j\Phi_\mu}$ with $$\Phi_\mu = \mu \frac{\Phi}{2^m}$$

where $\mu$ is a non-zero integer such that $-2^{m-1} \leq \mu \leq 2^{m-1}$ where $M=2^m$ is the modulation degree of the PSK symbols.

In an exemplary embodiment, m=1 and the time spreading of the transmission channel is $L^*T_s$ where $L^*$ is an integer equal to or higher than 1, and the lattice includes $2^L-1$ states with $2^{L+1}-1$ allowed branches, where $L=L^*+1$.

The present invention also relates to the receiver of a signal transmitted by a transmitter on a transmission channel, the signal being modulated by modulation symbols at a symbol frequency ($f_s$), the receiver including:

a demodulator providing observables ($y_k$) at the symbol frequency, each observable non-linearly depending on a predetermined number L of consecutive modulation symbols;

a Viterbi equalizer operating on a N-state lattice, each state representing a state of the transmission channel, each branch between two consecutive states of the lattice being associated with a modulation symbol, said equalizer including a branch metric calculation module receiving said observables, a metric calculation and path selection module from said branch metrics, and an in-lattice backtracing module for determining a survivor path, the receiver being characterised in that it further comprises:

a learning module (225) adapted to identify a pilot sequence of modulation symbols, said pilot sequence being in the form of a path passing through all the allowed branches of the lattice, and to store in a memory, for each of these branches, the corresponding observable;

the branch metric calculation module calculating the metric of a branch as a distance between the observable provided by the demodulator and the observable stored for said branch.

Advantageously, the pilot sequence of modulation symbols leads to a path passing once and only once through each allowed branch of the lattice.

According to an alternative, the modulation symbols are PSK symbols and the demodulator is a differential phase demodulator carrying out the hermitian product of consecutive samples of the signal received in baseband, the sampling being performed at the symbol frequency.

The PSK modulation symbols can be in the form of $e^{j\Phi_\mu}$ with $$\Phi_\mu = \mu \frac{\Phi}{2^m}$$

where $\mu$ is a non-zero integer such that $-2^{m-1} \leq \mu \leq 2^{m-1}$ where $M=2^m$ is the modulation degree of the PSK symbols.

According to an exemplary embodiment, m=1 and the time spreading of the transmission channel is $L^*T$ where $L^*$ is an integer equal to or higher than 1, and the lattice includes $2^L-1$ states with $2^{L+1}-1$ allowed branches, where $L=L^*+1$.

DETAILED DISCLOSURE OF PARTICULAR EMBODIMENTS

Figure 1:
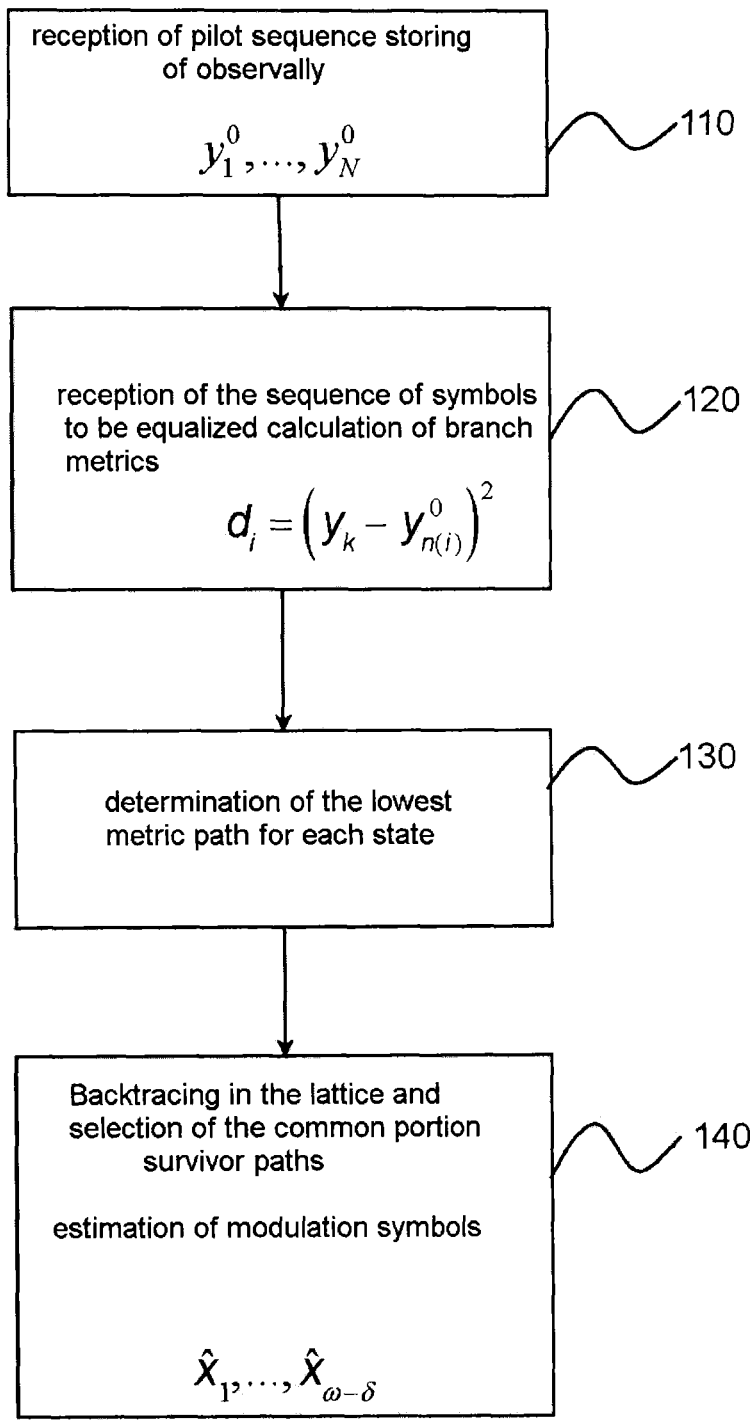
FIG. 1 schematically represents an equalization method according to a first embodiment of the invention.

In the following, a transmission channel will be considered on which a transmitter transmits modulation symbols belonging to a predetermined alphabet. More precisely, the modulation symbols modulate a carrier and the signal thus modulated is transmitted on the transmission channel.

The modulation symbols are obtained from information symbols (for example binary words and m bits) by means of a M-ary modulation with symbol. First, no hypotheses will be made on the modulation type used.

The receiver comprises a demodulator providing observables from the signal received. Each observable non-linearly depends on a predetermined number L of modulation symbols transmitted on the channel. If the modulation symbols are transmitted with the periodicity of a symbol time $T_s=1/F_s$, it will be understood that L is none other that the time spreading of the channel, expressed in number of symbol time.

It will be assumed in the following that the transmission channel is of the AWGN (Additive White Gaussian Noise) type. In this case, the observable provided by the demodulator at time k can be written as:

$$y_k = f_{NL}(x_k, \ldots, x_{k-L-1}, h) + n_k \quad (9)$$

where $f_{NL}$ is a non-linear function, h is the impulse response of the transmission channel, $x_k, \ldots, x_{k-L-1}$ are the L last modulation symbols transmitted on the channel and $n_k$ is a white Gaussian noise sample (it is reminded that for a linear transmission channel, there would be simply $$y_k = \sum_{p=0}^{L-1} h_p x_{k-p} + n_k \Big).$$

Under the AWGN hypothesis of the channel, the probability of observing $y_k$ given that the symbols $x_k, \ldots, x_{k-L-1}$ have been emitted is expressed as:

$$p(y_k \mid x_k, \ldots, x_{k-L-1}, h) = \frac{1}{\sigma\sqrt{2\pi}} \exp\left(-\frac{(y_k - f_{NL}(x_k, \ldots, x_{k-L-1}, h))^2}{2\sigma^2}\right) \quad (10)$$

If it is assumed that the noise samples are independent and identically distributed variables, the probability of observing a sequence of observables $y_1, \ldots, y_K$ given that the sequence of symbols $y_1, \ldots, y_K$ has been transmitted is none other than:

$$p(y_1, \ldots, y_K \mid x_1, \ldots, x_K) = \prod_{k=1}^{K} p(y_k \mid x_1, \ldots, x_K) \quad (11)$$

The likelihood of the sequence $x_1, \ldots, x_K$ in view of the observables $y_1, \ldots, y_K$ is $p(y_1, \ldots, y_K \mid x_1, \ldots, x_K)$. The likelihood maximum can thus be searched for as the sequence $\hat{x}_1, \ldots, \hat{x}_K$ such that:

$$\hat{x}_1, \ldots, \hat{x}_K = \operatorname*{argmax}_{x_1, \ldots, x_K}\left(\prod_{k=1}^{K} p(y_k \mid x_1, \ldots, x_K)\right) \quad (12)$$

that is equivalently, the logarithm function being an increasing function:

$$\hat{x}_1, \ldots, \hat{x}_K = \operatorname*{argmax}_{x_1, \ldots, x_K}\left(\sum_{k=1}^{K} \log p(y_k \mid x_1, \ldots, x_K)\right) \quad (13)$$

or even, in view of (10):

$$\hat{x}_1, \ldots, \hat{x}_K = \operatorname*{argmin}_{x_1, \ldots, x_K}\left(\sum_{k=1}^{K} (y_k - f_{NL}(x_k, \ldots, x_{k-L-1}, h))^2\right) \quad (14)$$

The sequence $\hat{x}_1, \ldots, \hat{x}_K$ fulfilling the likelihood maximum criterion can be obtained, in a known manner per se, by means of the Viterbi algorithm operating on a $M^{L-1}$ state lattice where M is the modulation degree (that is the cardinal of the modulation alphabet). It is reminded that the Viterbi algorithm relies on a modelling of the system observed (here the assembly made of the modulator, the transmission channel and the demodulator) in the form of a finite state machine. It consists in searching within the lattice made up by the possible transitions between successive states, for the most probable path. In the case of a metric based on a Euclidian distance, this is the lowest metric path, the metric of a path being calculated as the sum of the metrics of the branches making up this path. The metric of a branch is herein obtained from the distance, for example a Euclidian distance, between the observable $y_k$ and an observable stored in memory corresponding to said branch, as explained later.

It is reminded that, when a transmission channel is linear, it is generally sufficient to assess the impulse response of the channel, that is the $h_p$ coefficients, and to deduce the branch metric by $$\left(y_k - \sum_{p=0}^{L-1} h_p x_{k-p}\right)^2$$

where $p=1, \ldots, L-1$, are the modulation symbols associated with the branch initial state and where $x_k$ is the modulation symbol associated with the transition between the initial state and the final state of said branch.

In the non-linear case, the present invention advantageously provides an initialization step, wherein the transmitter transmits a pilot sequence of modulation symbols, this pilot sequence corresponding to a path passing through all the possible branches of the lattice. Preferably, the pilot sequence is of minimum length and corresponds to a path passing once, and only once, through each of the possible branches of the lattice.

The number of branches coming from a state being equal to the cardinal of the modulation alphabet, that is M, and the number of states being itself equal to $M^{L-1}$, the minimum length of a pilot sequence is $(L-1)+M^L$ symbols (the first L−1 symbols being used for initializing the first state).

In the initializing step, the pilot sequence is written as $x_1^0, \ldots, x_N^0$ and the corresponding observables as $y_1^0, \ldots, y_{N_0}^0$. For each branch, that is for each transition between an initial state and a final state, the value assumed by the corresponding observable is stored in memory. For example, if the initial state is given by $x_{n-1}^0, \ldots, x_{n-L-1}^0$ and that the branch $b_i$ corresponds to the input $x_n^0$, in other words leads to the final state defined by $x_n^0, \ldots, x_{n-L}^0$, the observable value stored in memory for this branch is:

$$y_n^0 = f_{NL}(x_n^0, \ldots, x_{n-L-1}^0, h) \quad (15)$$

Subsequently, during the actual equalization phase, when an observable $y_k$ is received whereas there is the same initial state $x_n^0, \ldots, x_{n+L-1}^0$, the metric $d_i$ of the branch associated with the same input $x_{n+L}^0$ is determined by:

$$d_i(y_k - y_{n(i)}^0)^2 \quad (16)$$

where the branches have been indexed by $i=1, \ldots, M^L$ and where $y_{n(i)}^0$ is the value stored for the branch i during the initialization step.

The most likely sequence of symbols is assessed from the Viterbi algorithm using the metrics of the branch (16) as explained later.

FIG. 1 schematically represents an equalization method according to a first embodiment of the invention.

In step 110, a pilot sequence is received of modulation symbols, $x_1^0, \ldots, x_Q^0$, corresponding to a path through all the lattice branches, that is through each branch connecting two successive states. The demodulator provides in response a sequence of observables $y_1^0, \ldots, y_{Q-1}^0$, each observable $y_n^0$, $n=1, \ldots, Q-1$, corresponding to a branch, that is a transition between an initial state defined by $x_{n-1}^0, \ldots, x_{n-L-1}^0$ and a final state defined by $x_n^0, \ldots, x_{n-L}^0$. For each of the observables $y_n^0$, $n=1, \ldots, Q-1$, the value of the observable in relation with the corresponding branch is stored in memory.

This initializing step can be performed once for all or at regular intervals. Preferably, it is performed with a periodicity lower than the channel coherence time. When the transmission is performed by packets, it can be provided that the pilot sequence is transmitted in a header of each packet or in the header of every P packets only.

After receiving a sequence of modulation symbols $x_1, \ldots, x_K$, an equalization is performed using the Viterbi algorithm as explained below.

In step 120, upon receiving a new symbol at time k, the demodulator provides an observable $y_k$. For each state of the lattice at instant k, and for each branch $b_i$ coming from this state, the branch metric is calculated as a distance between the observable corresponding to the modulation symbol to be equalized and the observable stored in the previous step for said branch. More precisely, the branch metric can be calculated by: $d_i = (y_k - y_{n(i)}^0)^2$ where $y_{n(i)}^0$ is the observable value stored in relation with the branch $b_i$.

In step 130, for each state j of the lattice, the lowest path leading to this state is determined, the lowest metric being given by:

$$L_j(k) = \min_{\pi(j)}(L_{\pi(j)}(k-1) + d_{\pi(j),j}) \quad (17)$$

where $\pi(j)$ is the state preceding j in the lattice and where $d_{\pi(j),j}$ is the branch metric connecting $\pi(j)$ state to j state. The state metrics are initialized (at time k=1) at an arbitrary positive or zero value, for example $L_j(1)=0$, $\forall j$. Thus, at each instant k, a single survivor path leading to j state is obtained.

Step 130 is performed at each symbol time.

At the end of a number of symbol times, for example at time ω, a backtracing operation known per se is performed.

More precisely, in 140, form any state j(ω), for example the state having the lowest (path) metric, the path having led to this state is traced back. The portion of this path prior to the time ω−δ where δ is the duration of the convergence window (expressed in symbol time) is retained. The arbitrary character of the final state selection arises from the fact that all the survivor paths converge when progressing in the lattice. In other words, all the survivors paths have a common portion when going beyond a predetermined duration δ from the current time ω.

The list of the branches corresponding to the path portion thus retained provides the modulation symbols $\hat{x}_1, \ldots, \hat{x}_{\omega-\delta}$. Alternatively, step 140 can directly provide the corresponding information symbols.

Step 140 is slidingly performed, for example with a periodicity δ or less.

Figure 2:
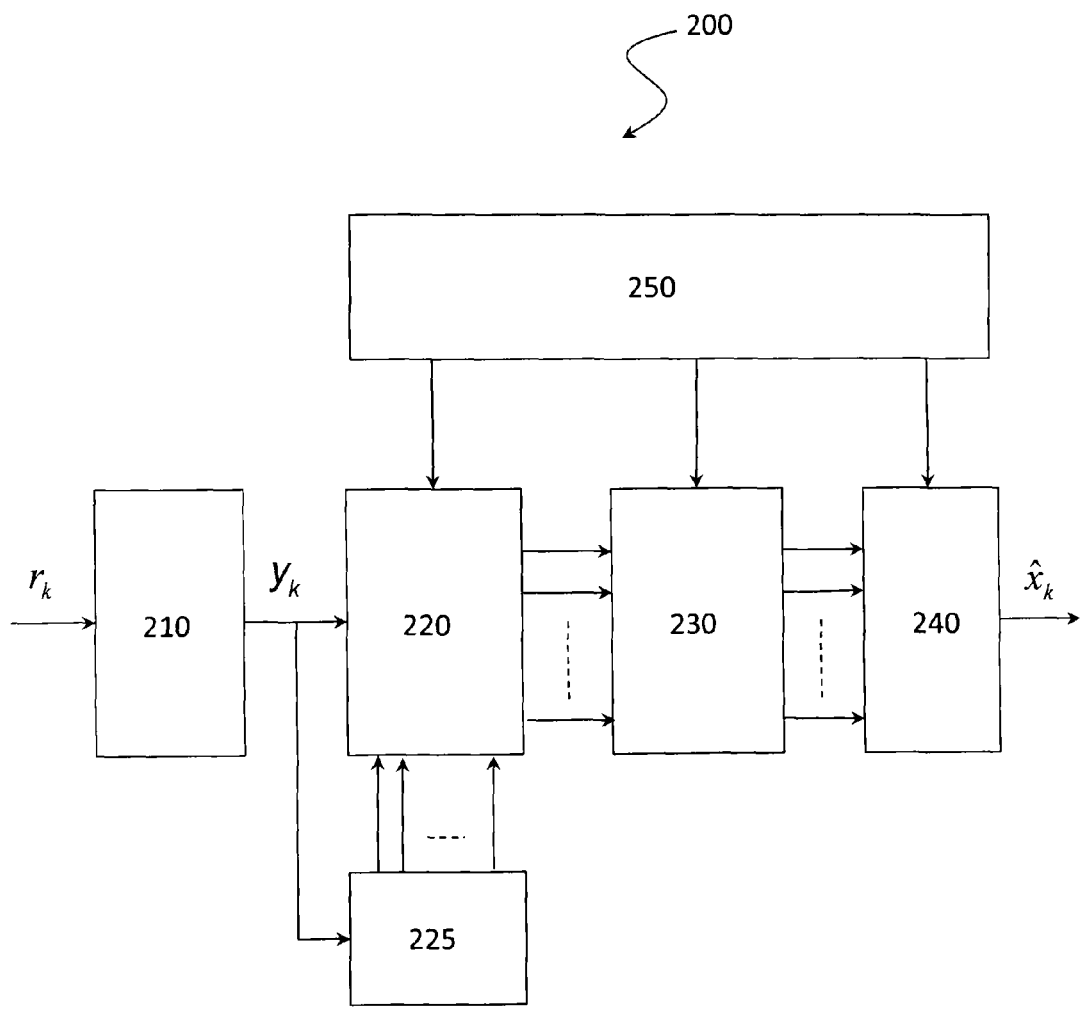
FIG. 2 schematically represents a receiver according to an embodiment of the invention.

FIG. 2 represents the structure of a receiver according to an embodiment of the invention.

The receiver 200 comprises a demodulator 210 providing, from the received signal, observables $y_k$ to the symbol rate $T_s$.

The observables $y_k$ are transmitted to a branch metric calculation module 220 on the one hand and to a learning module 225 on the other hand.

The learning module 225 locates, for example by a means of a synchronization header the start of a pilot sequence and, during the initialization phase, stores in a local memory the values of observables ($y_{n(i)}^0$) respectively associated with each of the branches $b_i$ of the lattice.

The branch metric calculation module 220 calculates at each symbol instant k, from the observable $y_k$, the metric of each branch $b_i$, $i=1, \ldots, M^L$ from the expression (16), the values $y_{n(i)}^0$ being retrieved from the local memory.

The module 230, called ACS (Add Compare Select) module in the terminology of the Viterbi algorithm, implements step 130. In other words, at each symbol time k and for each state j, it calculates, for each predecessor $\pi(j)$ of the state j, the sum of the metric of this predecessor state and of the metric of the branch from state $\pi(j)$ to state j. It then compares thus obtained sums and selects the predecessor state (and thus the branch) performing the lowest sum. This sum gives the metric of the state j at time k.

The module 240 performs backtracing of step 140, that is for a symbol time ω traces back to an arbitrary state j(ω) and only retains the portion of this path prior to the time ω−δ as explained above. The successive states (or branches) of this path portion give the modulation symbols $\hat{x}_1, \ldots, \hat{x}_{\omega-\delta}$.

The control module 250 controls the module 220, 230 and 240 to clock the calculation of the branch metrics, the ACS operations and backtracing.

A particular embodiment of the invention will be described in the following in the context of a PSK modulation alphabet and a differential demodulation, as mentioned in the introducing part of the present application.

For the sake of simplicity and without prejudice of generalization, this embodiment will be introduced in the case of a 2-PSK modulation alphabet and the results for any modulation alphabet of cardinal $M=2^m$ will be mentioned whenever required.

The modulation symbols are given for example by $e^{j\Phi/2}$ if the information bit is equal to 1 and $e^{-j\Phi/2}$ if the information bit is equal to 0. The angle Φ could be selected such that Φ=π/8.

More generally, if the cardinal of the PSK alphabet is $M=2^m$, it is possible to map a word of m bits on a PSK symbol of this alphabet.

On the receiver side, it is assumed that a phase demodulation is performed as explained in relation with expressions (5) and (6).

It will be assumed in the following that the transmission channel (excluding the differential demodulator) has a time spreading of L* symbol times. The time spreading of the channel including the differential demodulator is then $LT_s$, $L=L*+1$, since the differential demodulator introduces a further offset $T_s$ by virtue of its function.

In the case where the channel is restricted to a single path, that is if the transmission channel is memoryless (L*=1), three possible values of phase increment at the output of the demodulator can be observed, that is:

+Φ if there is a bit 0 followed by a bit 1 (transition 0→1, represented by +1);

−Φ if there is a bit 1 followed by a bit 0 (transition 1→0 represented by −1);

0 if there are two consecutive bits having the same value.

Figure 3A:
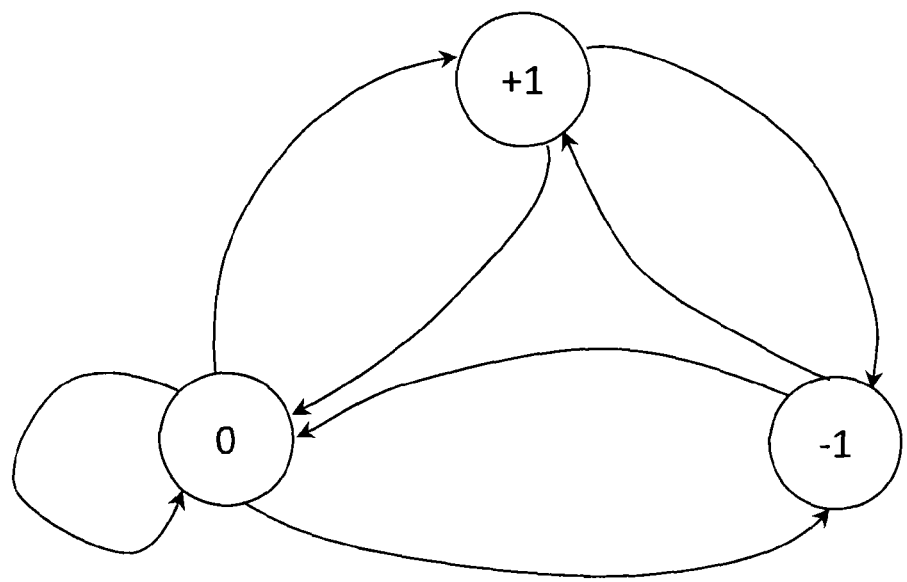
FIG. 3A represents a state diagram for a 2-PSK modulation and a perfect channel.
Figure 3B:
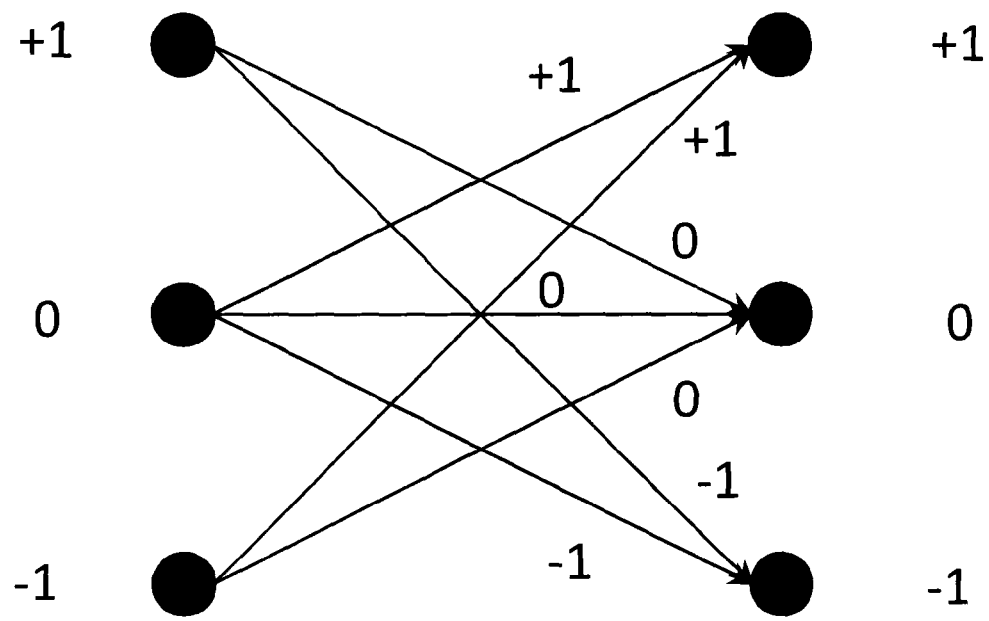
FIG. 3B represents a lattice corresponding to the state diagram of FIG. 3A.

FIG. 3A represents the corresponding state diagram and FIG. 3B represents a lattice indicating transitions between states.

The three possible states of the channel have been noted +1,0 and −1. It is noticed that all the transitions are not allowed in this diagram, only the state 0 can lead to all the other states (3 outgoing branches in the lattice) whereas states −1,+1 can only lead to an opposite state or to state 0 (2 outgoing branches in the lattice). Indeed, an increment of phase +1 whereas the state is +1 would mean two successive increments of +Φ and thus an output from the constellation in the counter-clockwise direction. In a similar way, an increment of −1 whereas the state is −1 would mean two successive increments of −Φ and thus an output from the constellation in the clockwise direction.

Generally, if the PSK symbols are in the form of $e^{j\Phi_\mu}$ with $$\Phi_\mu = \mu \frac{\Phi}{2^m}$$

where μ is a non-zero integer such that $-2^{m-1} \leq \mu \leq 2^{m-1}$, some transitions in the state diagram are prohibited. More precisely, for a state represented by the phase difference $$v \frac{\Phi}{2^{m-1}},$$

where ν is an integer such that $-2^{m-1} \leq v \leq 2^{m-1}$, |ν| transitions are prohibited.

Figure 4A:
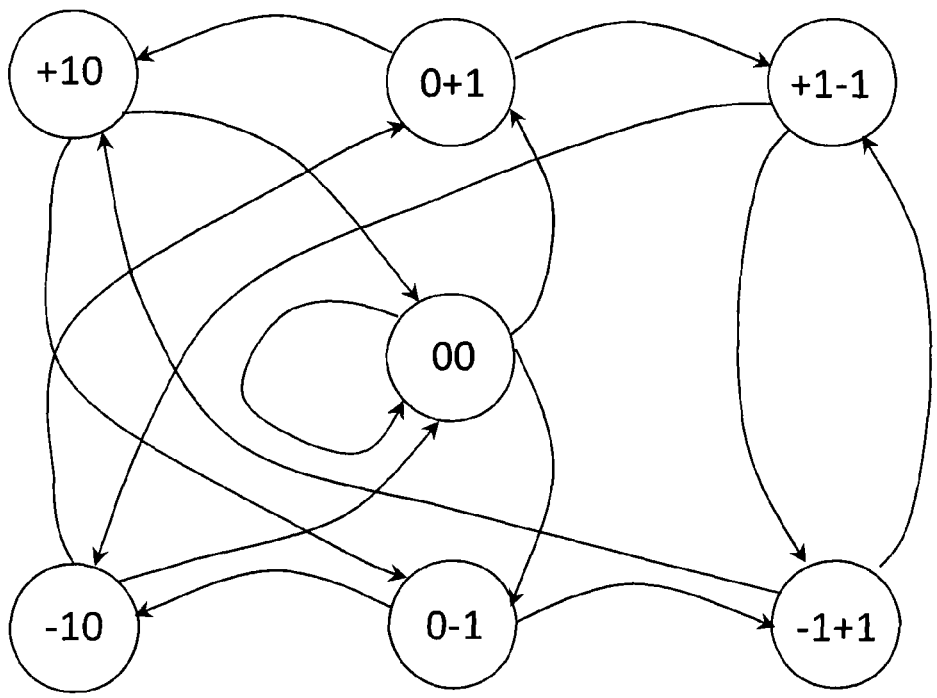
FIG. 4A represents a state diagram for a 2-PSK modulation and a channel having a time spreading.

FIG. 4A represents the state diagram relating to a channel having a time spreading equal to two symbol times (L*=2).

In this case, the output from the differential demodulator can be modelled by a state machine having L−1=2 memory elements, each memory element can contain a value +1 (increment of +Φ), a value −1 (increment of −Φ) or a zero value. The number of states of this machine is thus theoretically $3^{L-1}=9$. However, as has been seen above, the sequence +1,+1 and the sequence −1,−1 are prohibited. As a result, the number of states to be taken into consideration is only 7, as indicated in FIG. 4A.

Figure 4B:
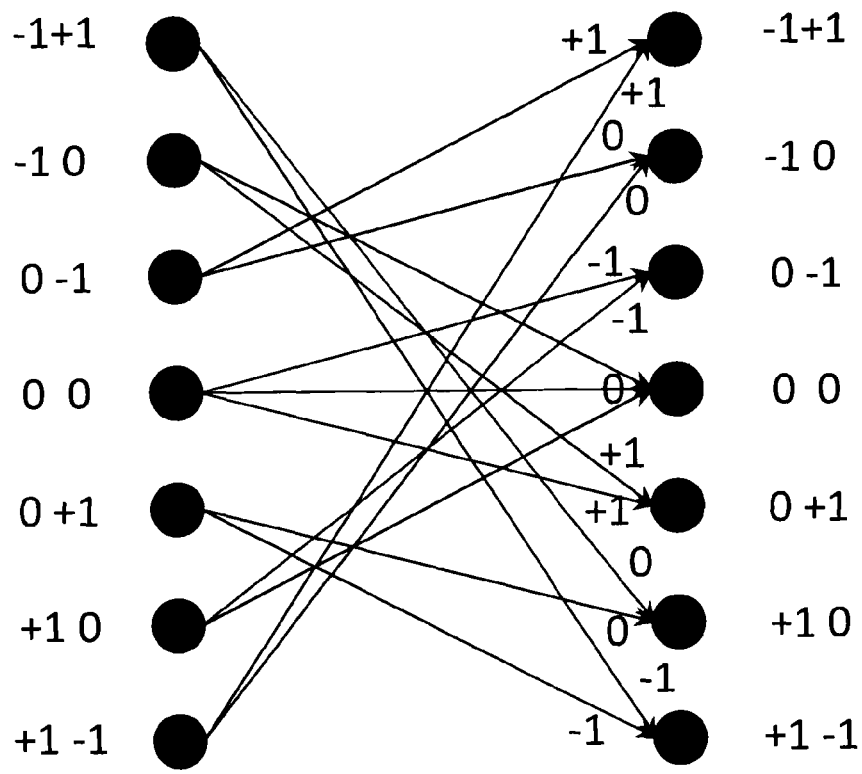
FIG. 4B represents a lattice corresponding to the state diagram of FIG. 4A.

FIG. 4B represents the lattice corresponding to the state diagram of FIG. 4A. The seven states are represented by the sequences −1,+1; −1,0; 0,−1; 0,0; 0,+1; +1,0; +1,−1. Only the state 00 can lead to 3 states (3 outgoing branches), wherein the other states can only lead to two states. The total number of branches is thus lower than that of a completely connected lattice, that is where a state could lead to either state. It is noticed that the lattice only includes 15 possible branches (that is at allowed transitions) instead of 27 branches for an entirely connected lattice (3 branches for each of the 9 states).

Generally, for a channel with L* states, L*≥1, the output of the differential demodulator can be modelled as a finite state machine having theoretically $3^{L-1}$ possible states of which in practice only $2^L-1$ states are allowed, the other being prohibited because of the structure of the modulation constellation. The number of allowed states corresponds to the multiplicity of the symbol sequence to be taken into account to define the demodulator output. Further, among the $3^L$ branches of an entirely connected lattice, only $2^{L+1}-1$ branches are actually allowed in the lattice (allowed transitions of the state machine), the other branches corresponding to prohibited transitions (output from the constellation in the counter-clockwise direction or clockwise direction).

Yet more generally, for a PSK modulation alphabet of cardinal M such as defined above, the total number of allowed states remains always lower than the number of theoretically possible states, that is $(2M-1)^{L-1}$. For example:

For L*=2, that is, L=3, there are:
for M=2: 9 theoretically possible states, 7 allowed states;
for M=4: 49 theoretically possible states, 7 allowed states;
for M=8: 225 theoretically possible states, 43 allowed states;
for M=16: 961 theoretically possible states, 91 allowed states.

for L*=3, that is, L=4, there are:
for M=2: 27 theoretically possible states, 15 allowed states;
for M=4: 343 theoretically possible states, 51 allowed states;
for M=8: 3375 theoretically possible states, 123 allowed states;
for M=16: 29791 theoretically possible states, 267 allowed states.

It is reminded that the complexity of the Viterbi algorithm exponentially varies with the time spreading of the channel. It will thus be understood that this particular embodiment is advantageous in that it enables not to have to take into account all the theoretically possible states of the state machine but only some of them.

As set out in relation with FIGS. 1 and 2, the branch metric calculation during the equalization phase assumes a prior initialization phase using a pilot sequence.

Figure 5A:
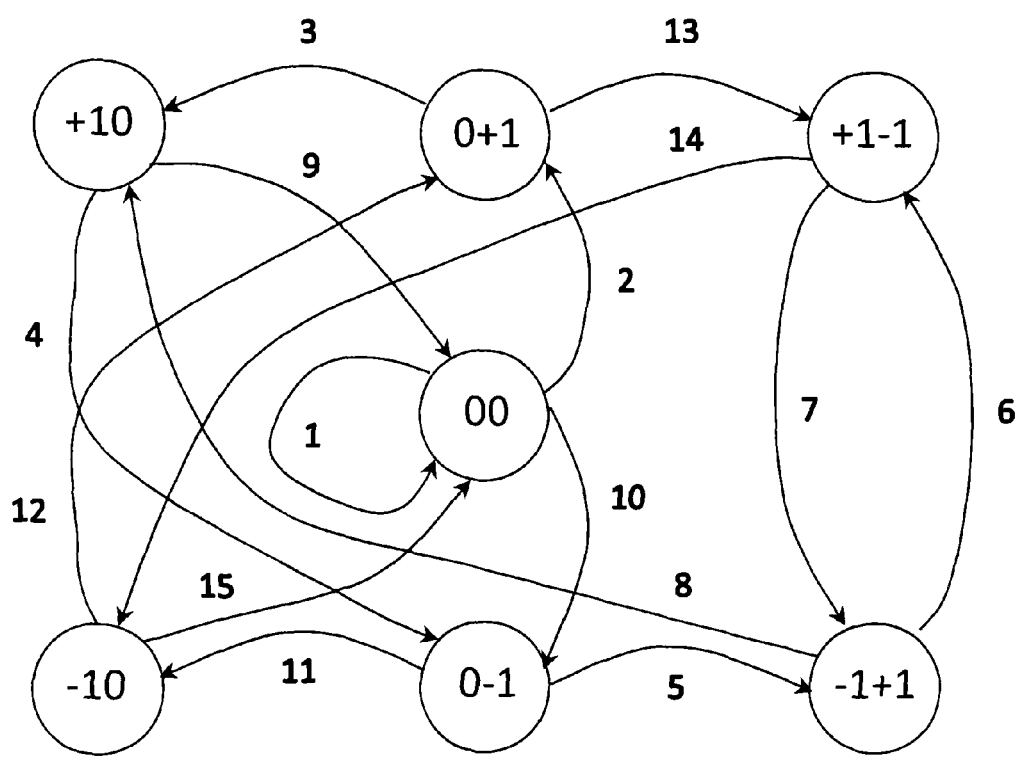
FIG. 5A represents the flow within the state diagram of FIG. 4A, corresponding to the transmission of a pilot sequence.

The example of the modulation of the degree M=2 and a channel having a total spreading of $3T_s(L=3)$ is again considered. FIG. 5A represents the flow within the state diagram upon transmitting an exemplary pilot sequence:

$$00\ 011010111001000 \tag{18}$$

where the first 2 bits are used to initialize the state machine.

Figure 5B:
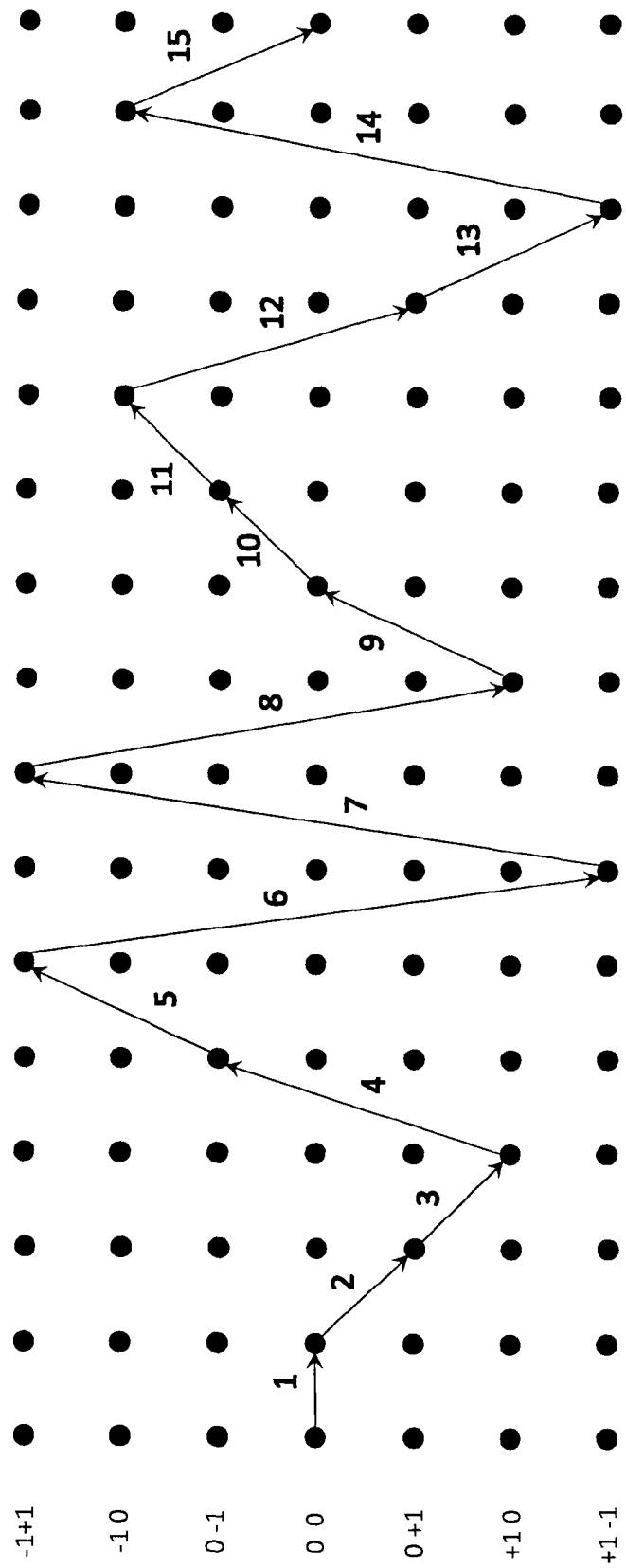
FIG. 5B represents the flow within the lattice of FIG. 4B, corresponding to the transmission of the same pilot sequence.

This sequence leads to a path through all the allowed branches of the lattice as can be seen in FIG. 5B. The corresponding sequence at the output of the differential demodulator is then:

$$0,+1,0,-1,+1,-1,+1,0,0,-1,0,+1,-1,0,0 \tag{19}$$

Besides, this pilot sequence is of a minimum length in that it passes once and only once through each branch of the lattice.

In a similar way, for a modulation of degree M=2 and a channel having a spreading of $4T_s$, the pilot sequence could for example be used:

$$111\ 00000100011001010011101011111000 \tag{20}$$

One can check that this sequence leads to a path through all the (21) allowed branches of the lattice. The corresponding sequence at the output of the differential demodulator is then:

$$0,0,-1,0,0,0,0,+1,-1,0,0,+1,0,-1,0,+1,-1,+1,-1,0,+1,$$
$$0,0,-1,+1,-1,+1,0,-1,+1,0,0,0,-1,0,0 \tag{21}$$

The invention claimed is:

1. A method for receiving modulation symbols transmitted by a transmitter on a wireless transmission channel to a receiver, the signal being modulated by modulation symbols at a symbol frequency ($f_s$), The method comprising:

providing, by a demodulator, observables ($y_k$) at the symbol frequency, the observables corresponding to modulation symbols detected from the signal at the demodulator, each observable non-linearly depending on a predetermined number L of consecutive modulation symbols;

operating, by a Viterbi equalizer, on a N-state lattice, each state representing a state of the transmission channel, each branch between two consecutive states of the lattice being associated with a modulation symbol, said equalizer including a branch metric calculation module receiving said observables, a metric calculation and path selection module from said branch metrics, and an in-lattice backtracing module for determining a survivor path;

identifying, by a learning module, a pilot sequence of modulation symbols, said pilot sequence leading to a path passing through all the allowed branches of the lattice, and storing in a memory, for each of these branches, the corresponding observable; and calculating, by the branch metric calculation module, the metric of a branch as a distance between the observable provided by the demodulator and the observable stored for said branch.

2. The method for receiving modulation symbols according to claim 1, wherein the pilot sequence of modulation symbols leads to a path passing once and only once through each allowed branch of the lattice.

3. The method for receiving modulation symbols according to claim 1, the modulation symbols are PSK symbols and that the observables are obtained as the hermitian product of consecutive samples of the signal received in baseband, the sampling being performed at the symbol frequency.

4. The method for receiving modulation symbols according to claim 3, wherein the PSK modulation symbols are in the form of $e^{j\Phi_\mu}$ with $$\Phi_\mu = \mu \frac{\Phi}{2^m}$$

where $\mu$ is a non-zero integer such that $-2^{m-1} \leq \mu \leq 2^{m-1}$ where $M=2^m$ is the modulation degree of the PSK symbols.

5. The method for receiving modulation symbols according to claim 4, wherein m=1 and the time spreading of the transmission channel is $L^*T_s$ where $L^*$ is an integer equal to or higher than 1, and that the lattice includes $2^L-1$ states with $2^{L+1}-1$ allowed branches, where $L=L^*+1$.

6. A receiver of a signal transmitted by a transmitter on a wireless transmission channel, the signal being modulated by modulation symbols at a symbol frequency ($f_s$), the receiver including:

a demodulator providing observables ($y_k$) at the symbol frequency, the observables corresponding to modulation symbols detected from the signal at the demodulator, each observable non-linearly depending on a predetermined number L of consecutive modulation symbols;

a Viterbi equalizer operating on a N-state lattice, each state representing a state of the transmission channel, each branch between two consecutive states of the lattice being associated with a modulation symbol, said equalizer including a branch metric calculation module receiving said observables, a metric calculation and path selection module from said branch metrics, and an in-lattice backtracing module for determining a survivor path; and a learning module adapted to identify a pilot sequence of modulation symbols, said pilot sequence leading to a path passing through all the allowed branches of the lattice, and to store in a memory, for each of these branches, the corresponding observable;

the branch metric calculation module calculating the metric of a branch as a distance between the observable provided by the demodulator and the observable stored for said branch.

7. The receiver according to claim 6, wherein the pilot sequence of modulation symbols leads to a path passing once and only once through each allowed branch of the lattice.

8. The receiver according to claim 6, wherein the modulation symbols are PSK symbols and that the demodulator is a differential phase demodulator carrying out the hermitian product of consecutive samples of the signal received in baseband, the sampling being performed at the symbol frequency.

9. The receiver according to claim 8, wherein the PSK modulation symbols are in the form of $e^{j\Phi_\mu}$ with $$\Phi_\mu = \mu \frac{\Phi}{2^m}$$

where $\mu$ is a non-zero integer such that $-2^{m-1} \leq \mu \leq 2^{m-1}$ where $M=2^m$ is the modulation degree of the PSK symbols.

10. The receiver according to claim 9, wherein m=1 and the time spreading of the transmission channel is $L^*T_s$, where $L^*$ is an integer equal to or higher than 1, and that the lattice includes $2^L-1$ states with $2^{L+1}-1$ allowed branches, where $L=L^*+1$.

* * * * *